US006986923B1

(12) United States Patent
Junghans et al.

(10) Patent No.: US 6,986,923 B1

(45) Date of Patent: Jan. 17, 2006

(54) PACK FOR ADHESIVE SHEETS

(75) Inventors: Andreas Junghans, Hamburg (DE); Achim Franck, Hamburg (DE); Bernd Lühmann, Norderstedt (DE); Andreas Wieck, Halstenbek (DE); Thorsten Krawinkel, Hamburg (DE)

(73) Assignee: Tesa AG, Hamburg (DE)

( * ) Notice: Subject to any disclaimer, the term of this patent is extended or adjusted under 35 U.S.C. 154(b) by 0 days.

(21) Appl. No.: 09/717,954

(22) Filed: Nov. 21, 2000

(30) Foreign Application Priority Data

Nov. 26, 1999 (DE) ................................ 199 56 946

(51) Int. Cl.
*B32B 33/00* (2006.01)

(52) U.S. Cl. .................... 428/40.1; 206/411; 428/41.2; 428/41.3; 428/41.4; 428/41.6; 428/41.7; 428/41.8

(58) Field of Classification Search ............... 428/40.1, 428/41.2, 41.3, 41.4, 41.6, 41.7, 44.8, 41.8; 206/411

See application file for complete search history.

(56) References Cited

U.S. PATENT DOCUMENTS

| | | | | |
|---|---|---|---|---|
| 5,491,012 | A * | 2/1996 | Luhmann | 428/40.1 |
| 5,516,581 | A * | 5/1996 | Kreckel et al. | 428/317.3 |
| 6,544,639 | B1 * | 4/2003 | Luhmann et al. | 428/343 |

FOREIGN PATENT DOCUMENTS

| | | |
|---|---|---|
| DE | 197 20 145 A1 | 11/1998 |
| DE | 198 42 865 A1 | 3/2000 |
| GB | 617431 | 7/1946 |
| GB | 2010699 A | 7/1979 |
| LU | 35863 | 3/1958 |

* cited by examiner

*Primary Examiner*—Nasser Ahmad

(74) *Attorney, Agent, or Firm*—Norris, McLaughlin & Marcus, P.A.

(57) ABSTRACT

A pack for adhesive sheets which a) are detachable without residue or destruction by extensive stretching in the direction of their bond plane and b) have on one or both sides a pressure-sensitive adhesive composition based on an elastomer resin mixture, wherein c) the pack is UV-impermeable and d) comprises sheetlike liner materials for the regions of the pressure-sensitive adhesive composition that are to be bonded, and/or an outer packaging for the adhesive sheet, and/or an individual pack with transparent packaging elements.

20 Claims, No Drawings

PACK FOR ADHESIVE SHEETS

The invention relates to a pack for adhesive sheets, especially for single-sided or double-sided adhesive sheets or adhesive-sheet strips which are detachable without residue or destruction by extensive stretching in the bond plane.

Elastically or plastically highly extensible (strippable) self-adhesive tapes which are redetachable without residue or destruction by extensive stretching essentially in the bond plane are known from U.S. Pat. No. 4,024,312, DE 3331 016, WO 92/11332, WO 92/11333, DE 42 22 849, WO 95/06691, DE 195 31 696, DE 196 26 870, DE 196 49 727, DE 196 49 728, DE 196 49 729, DE 197 08 366, DE 197 20 145, WO 99/31193, and WO 99/37729.

They are frequently used in the form of single-sided or double-sided adhesive sheet strips (adhesive tape strips, adhesive strips) which preferably have a nonadhesive grip-tab region from which the detachment process is initiated. Particular applications of such self-adhesive tapes are described, inter alia, in DE 42 33 872, DE 195 11 288, U.S. Pat. No. 5,507,464, U.S. Pat. No. 5,672,402, and WO 94/21157. Specific embodiments are described, for example, in DE 44 28 587, DE 44 31 914, WO 97/07172, DE 196 27 400, WO 98/03601, and DE 196 49 636, DE 197 20 526, The invention relates to a pack for adhesive sheets, especially for single-sided or double-sided adhesive sheets or adhesive-sheet strips which are detachable without residue or destruction by extensive stretching in the bond plane.

Elastically or plastically highly extensible (strippable) self-adhesive tapes which are redetachable without residue or destruction by extensive stretching essentially in the bond plane are known from U.S. Pat. No. 4,024,312, DE 33 31 016, WO 92/11332, WO 92/11333, DE 42 22 849, WO 95/06691, DE 195 31 696, DE 196 26 870, DE 196 49 727, DE 196 49 728, DE 196 49 729, DE 197 08 366, DE 197 20 145, WO 99/31193, and WO 99/37729.

They are frequently used in the form of single-sided or double-sided adhesive sheet strips (adhesive tape strips, adhesive strips) which preferably have a nonadhesive grip-tab region from which the detachment process is initiated. Particular applications of such self-adhesive tapes are described, inter alia, in DE 42 33 872, DE 195 11 288, U.S. Pat. No. 5,507,464, U.S. Pat. No. 5,672,402, and WO 94/21157. Specific embodiments are described, for example, in DE 44 28 587, DE 44 31 914, WO 97/07172, DE 196 27 400, WO 98/03601, and DE 196 49 636, DE 197 20 526, DE 197 23 177, DE 197 23 198, DE 197 26 375, DE 197 56 084, and DE 197 56 816.

Preferred fields of use of the aforementioned adhesive sheet strips comprise, in particular, the residuelessly and nondestructively detachable fixing of light to moderately heavy articles in the domestic, workplace and office area. In these applications they replace conventional fastening means, such as pins, hooks, thumb tacks, nails, screws, conventional self-adhesive tapes, and liquid adhesives, to name but a few. Essential factors for the successful use of abovementioned adhesive sheet strips, as well as the capacity for residueless and nondestructive detachment of bonded articles, are their simple and rapid bonding and their secure holding for the intended bonding period.

Pressure-sensitive adhesive compositions which are suitable in accordance with the abovementioned patents include primarily those based on natural rubber resin mixtures, synthetic rubber resin mixtures, and acrylate copolymers. In practical application, however, pressure-sensitive adhesive compositions based on styrene block copolymer resin mixtures have become firmly established in the market. Accordingly, almost all of the products Command® Adhesive of Minnesota Mining and Manufacturing Co. Inc., St. Paul (USA), tesa® Power-Strips®, tesa® Power-Strips® mini and tesa® Poster-Strips of Beiersdorf AG, Hamburg (D) and Plastofix® Formula Force 1000 of Plasto (F), use a pressure-sensitive adhesive composition based on styrene block copolymer resin mixtures.

A typical feature of pressure-sensitive adhesive compositions based on styrene block copolymer resin mixtures is their susceptibility to damage by UV radiation, ozone damage and thermooxidative damage, which is significantly higher than that, for example, of acrylate copolymers. These comments apply particularly to pressure-sensitive adhesive compositions based on those styrene block copolymers comprising elastomer chains containing unsaturated carbon—carbon bonds, as is the case, for example, for styrene block copolymers containing polybutadiene blocks and polyisoprene blocks. Accordingly, the formulation of pressure-sensitive adhesive compositions based on the abovementioned styrene block copolymers typically takes account of measures for their appropriate stabilization. For instance, antioxidants and, in some cases, light stabilizers as well are added to styrene block copolymers and tackifier resins as early as during the processes for their preparation. In order to produce sufficient protection against aging for, for example, the compounding of the adhesive composition, further processing steps, such as processing from the melt, for example, storage periods, and the period of use of the products comprising the corresponding pressure-sensitive adhesive compositions, it is also common for a plurality of stabilizers, such as primary antioxidants, secondary antioxidants, C-radical scavengers, metal scavengers, and various kinds of light stabilizers, to be admixed to the pressure-sensitive adhesive compositions during their preparation.

High stability to aging is essential for pressure-sensitive adhesive sheet strips which are redetachable without residue or destruction by extensive stretching in the bond plane, especially in respect of their diverse fields of application. At the formulation stage it is necessary to use appropriate additives. Furthermore, there is recognition of the particular susceptibility, with such adhesive sheets, of a grip tab protruding from the bonded joint.

For instance, DE 42 22 849 describes, for example, a "Strip of an adhesive sheet and its use for a redetachable bond" (DE 42 22 849 C1, title), "one end of the strip being provided on both sides with a UV-impermeable cover which acts simultaneously as a grip tab for pulling" (DE 42 22 849 C1, claim 1). The objective of the UV-impermeable grip tab is to avoid tearing when the strip is pulled for the purpose of separation (DE 42 22 849 C1, p. 2, lines 36, 37).

Furthermore, the in-pack leaflet for tesa® Power-Strips®, tesa® Power-Strips® mini and tesa® Poster-Strips indicates that they are unsuitable for bonds on window panes.

Accordingly there has been no lack of proposals as to how such adhesive sheets should be treated in order to make it possible to offer products of uniformly good quality. Furthermore, these proposals, and their results as manifested in the commercial products, are undisputedly capable of improving these adhesive sheets relative to their original product variants. At the same time, however, again and again there are cases in daily practice in which evidently inadequate products are used, without any explanation being possible for why indeed these products were deficient, in terms for instance of finger tack, or else in terms of reduced tip-shear stability of a bond performed therewith; the peel strength of a bond formed therewith may also exhibit poor results, without it being possible to derive therefrom any information as to the reason.

It is an object of the present invention to remedy this situation, especially to be able to offer the consumer a product of uniformly high quality in the form of an adhesive sheet, without disappointment arising in the course of its use, in terms of the performance of a bond produced therewith and its subsequent parting.

This object is achieved by a pack for such adhesive sheets, as detailed in the claims.

It has in fact been found that the packaging of such adhesive sheets has not to date been given the attention it deserves, either in the patent literature or in the various products available commercially in the art. Adhesive sheets of the type specified here, lined with conventional release papers, are found to be inadequately packaged, and the customary blister packs as well prove to be inadequate, owing to their deficient UV impermeability.

Thus it has been found that abovementioned standard commercial self-adhesive products, although in some cases lined with comparatively thick release papers, experience significant reductions in their bonding performance if prior to their use they are exposed to UV irradiation, as may readily occur in a domestic living environment or in a selling environment, even without the adhesive strips having necessarily been exposed to direct insolation. Thus surprisingly, for example, tesa® Power-Strips® removed from the original sales pack and exposed to normal indoor light, produced by fluorescent tubes, show a marked reduction in bonding performance within a few weeks, despite the fact that the Power-Strips® removed from the original sales pack have a substantially opaque release paper lining on both sides and, moreover, are sealed individually in substantially opaque paper pouches. The results following stronger UV exposure, after direct insolation, for example, are correspondingly more drastic. A corresponding drop in bonding performance, on the other hand, does not occur with products stored in the dark, even after very long storage periods and elevated storage temperatures (e.g., 1 year at +40° C.). When selected volume properties of such differently stored tesa® Power-Strips® are then investigated, for example their tensile strength or their maximum elongation, in comparison to products stored in the dark, no differences are detectable within the bounds of measurement accuracy. The effects which influence the bond strength consequently affect primarily the surface of the pressure-sensitive adhesive strips.

Whereas for industrial applications of self-adhesive tapes it may be possible to specify the processing and storage conditions and the adhesion substrates to be used, this is typically not the case for the private use of self-adhesive tapes or for use in an office or domestic working environment. Adhesive tapes for successful use in such areas must certainly be able to be used reliably on a large number of substrates, under a wide variety of climatic conditions, highly diverse light exposure and highly diverse handling. Such facts impose, correspondingly, high requirements on the aging stability of appropriate adhesive strips.

Comparative investigation of tesa® Power-Strips®, tesa® Power-Strips®mini, tesa® Poster-Strips, Command® Adhesive Strips, and Plastofix® Formula Force 1000 adhesive strips (the pressure-sensitive adhesive compositions of said adhesive strips are all based on styrene block copolymer resin mixtures) shows that all of the aforementioned adhesive strips experience a significant deterioration in their bonding performance following UV exposure, ranging up to the complete loss of any adhesiveness whatsoever. Tests were carried out both for the original adhesive strips, equipped with liner materials (release papers or release films) applied by the respective manufacturer, and for the tesa® Power-Strips® additionally furnished with their original sealing paper covers, and, in the case of the Command® Adhesive Strips and the Plastofix® Formula Force 1000 adhesive strips, for the adhesive strips in their original packaging (cardboard furnished with a transparent film blister cover).

It is therefore evident that the adhesive sheets on the market to date that are residuelessly and nondestructively detachable by extensive stretching in the bond plane lack adequate protection to enable them to durably retain their original bonding performance even under UV exposure conditions as commonly occur in domestic, working and office environments, etc. This applies in respect of the liner papers and/or liner films that are currently used, the sealing covers that are used in some cases, and, likewise, the transparent packaging materials that are used.

Possibilities for obtaining products possessing enhanced UV stability include the use of very highly hydrogenated and thus more chemically resistant starting materials, as provided, for example, by hydrogenated styrene block copolymers blended with hydrogenated hydrocarbon resins. Such an approach, however, is hampered by a number of disadvantages. First, it drastically reduces the number of possible formulation constituents available for formulating the adhesive composition. Furthermore, by using saturated styrene block copolymers rather than unsaturated block copolymers, it is typically impossible to realize pressure-sensitive adhesive compositions possessing the appropriate performance capacity. In fact, however, because of the tertiary carbon atoms they all contain, hydrogenated tackifier resins in particular possess, in principle, the same defects as unsaturated resins, albeit at a more favorable level. Although usually to a less pronounced extent, they also may be damaged by UV radiation on exposure. A further serious disadvantage are the costs of hydrogenated starting materials, which are very much higher in comparison.

In many cases, transparent packaging materials are desired for more attractive configuration of the product offering, or for reasons of visibility of the packaged material. Examples of corresponding packs include cardboard cartons with transparent windows, blister packs, and tubular-bag packs. The same applies if the adhesive sheet strips are to be provided with transparent liner materials. Here again, the present invention offers practicable routes to success through appropriate packaging.

By means of the use of special liner materials, especially sheetlike liner materials, which effectively suppress the ingress of UV radiation from the damaging wavelength ranges to the surface of the adhesive composition up until the time of bonding, it is possible to achieve significant improvements in product quality which are of great significance for practical purposes. Particularly appropriate is the use of release-coated papers, especially those provided with silicone release coatings, and release-coated polymer films, especially those provided with silicone release coatings, which are in direct contact with the pressure-sensitive adhesive surfaces to be protected. Suitable liner materials in accordance with the invention are those whose transmissions for electromagnetic radiation are $<2\%$ in the wavelength range between 240 nm and 280 nm, preferably $<1\%$; $<2\%$ in the wavelength range between 280 nm and 320 nm, preferably $<1\%$; $<5\%$ in the wavelength range between 320 nm and 360 nm, preferably $<2\%$ and with particular preference $<1\%$; and <approximately 80% in the wavelength range between 360 nm and 420 nm, preferably <20%, with particular preference <2%. Preferably, the transmission increases as the wavelength of the electromagnetic radiation goes up. In order to obtain high extinction even in the long-wavelength range between 360 nm and 420 nm, for transparent release films, it is advantageous to use transparent, colored release materials.

Additionally or alternatively it is possible in accordance with the invention to use outer packaging, especially sealing papers or sealing films, for sealing-in the adhesive strips in order to effectively suppress the ingress of UV radiation from the damaging wavelength ranges to the surface of the adhesive composition up until the time of bonding. Suitable outer packaging materials in accordance with the invention are those whose transmissions for electromagnetic radiation are <2% in the wavelength range between 240 nm and 280 nm, preferably <1%, <2% in the wavelength range between 280 nm and 320 nm, preferably <1%; <5% in the wavelength range between 320 nm and 360 nm, preferably <2%, with particular preference <1%; and <approximately 80% in the wavelength range between 360 nm and 420 nm, preferably <20%, with particular preference <2%. Preferably, the transmission increases as the wavelength of the electromagnetic radiation goes up. In order to obtain a high extinction even in the long-wavelength range between 360 nm and 420 nm, for transparent outer packaging materials (e.g., transparent sealing films), it is advantageous to use transparent, colored films.

Alternatively, it is possible in accordance with the invention to use combinations of sheetlike liner materials and outer packaging materials (e.g., sealing papers or sealing films). Corresponding combinations have transmissions of <2% in the wavelength range between 240 nm and 280 nm, preferably <1%, <2% in the wavelength range between 280 nm and 320 nm, preferably <1%; <5% in the wavelength range between 320 nm and 360 nm, preferably <2%, with particular preference <1%; and <approximately 80% in the wavelength range between 360 nm and 420 nm, preferably <20%, with particular preference <2%. Preferably, the transmission increases as the wavelength of the electromagnetic radiation goes up. In order to obtain a high extinction even in the long-wavelength range between 360 nm and 420 nm, for transparent liner films and/or transparent outer packaging materials (e.g., transparent sealing films), it is advantageous to use transparent, colored films.

Additionally or alternatively it is possible to configure packaging materials which are optically transparent in the visible wavelength range (e.g., plastic blister films, windows in cardboard cartons, tubular-bag films, etc.) in such a way that they effectively suppress the ingress of UV radiation into the adhesive strips in their final packaging (e.g., packed in individual packs). Suitable optically transparent packaging materials in accordance with the invention are those whose transmissions for electromagnetic radiation are <2% in the wavelength range between 240 nm and 280 nm, preferably <1%; <2% in the wavelength range between 280 nm and 320 nm, preferably <1%; <5% in the wavelength range between 320 nm and 360 nm, preferably <2%, with particular preference <1%; and <approximately 80% in the wavelength range between 360 nm and 420 nm, preferably <20%, with particular preference <2%. Preferably, the transmission increases as the wavelength of the electromagnetic radiation goes up. In order to obtain a high extinction even in the long-wavelength range between 360 nm and 420 nm, for transparent packaging, it is advantageous to use transparent, colored packaging materials.

Through the use of the aforementioned liner materials and/or outer packaging materials (e.g., sealing films or sealing papers) and/or final-packaging materials, it is possible to realize self-adhesive strips which are redetachable without residue or destruction by extensive stretching and which very largely retain their bonding performance even after UV exposure and which therefore enjoy a significant advantage in terms of practical handling.

DETAILED DESCRIPTION

Product Structure

Adhesive Sheets

Adhesive sheets to be protected against UV degradation in accordance with the invention comprise, in particular, those in accordance with U.S. Pat. No. 4,024,312, DE 33 31 016, WO 92/11333, DE 42 22 849, WO 95/06691, DE 196 26 870, DE 196 49 727, DE 196 49 728, DE 196 49 729, and DE 197 08 366 which use pressure-sensitive adhesive compositions based on elastomer resin mixtures. In particular, adhesive sheets to be protected against UV degradation in accordance with the invention use pressure-sensitive adhesive compositions based on polymeric dienes, such as natural rubber, synthetic polyisoprene, and polybutadiene, for example. Moreover, adhesive sheets to be protected against UV degradation in accordance with the invention use pressure-sensitive adhesive compositions based on styrene block copolymers. Preferred styrene block copolymers comprise those with elastomer blocks based on 1,3-dienes, such as polyisoprene, polybutadiene, and isoprene-butadiene copolymers, for example, and the partially or fully hydrogenated analogs corresponding to the aforementioned systems. Moreover, adhesive sheets to be protected against UV degradation in accordance with the invention use pressure-sensitive adhesive compositions based on random copolymers of conjugated dienes and further polymerizable compounds, such as styrene-butadiene copolymers or acid-functionalized styrene-butadiene copolymers, for example, to name but a few. In addition, adhesive sheets to be protected against UV degradation in accordance with the invention use pressure-sensitive adhesive compositions based on polyolefinic elastomers. Also possible for use in accordance with the invention are adhesive sheets comprising pressure-sensitive adhesive compositions based on mixtures of the aforementioned elastomers and based on blends of the aforementioned elastomers with other polymers.

Liners of Low UV Transmission

Suitable sheetlike liner materials which effectively suppress the ingress of UV radiation from the damaging wavelength ranges to the surface of the adhesive composition up until the time of bonding have transmissions for electromagnetic radiation which are <2% in the wavelength range between 240 nm and 280 nm, preferably <1%; <2% in the wavelength range between 280 nm and 320 nm, preferably <1%; <5% in the wavelength range between 320 nm and 360 nm, preferably <2%, with particular preference <1%; and <approximately 80% in the wavelength range between 360 nm and 420 nm, preferably <20%, with particular preference <2%. Preferably, the transmission increases as the wavelength of the electromagnetic radiation goes up. In order to obtain low transmission even in the long-wavelength range between 360 nm and 420 nm, it is advantageous to use colored materials, especially materials with black pigmentation or coloring.

Preference is given in accordance with the invention to using liner materials based on paper or polymer film. Liner materials are, in particular, release-coated on the adhesive composition side. It is preferred to use polymer films and papers coated with silicone release coatings.

Where paper-based liner materials are used, it is possible, depending on what is required, to use highly calendered papers of high density, papers glazed on one or both sides, papers with a mineral coating on one or both sides, or papers with a plastic coating on one or both sides, in accordance with the invention. Typical paper basis weights are between 40 $g/m^2$ and 160 $g/m^2$, preferably between 60 and 140 $g/m^2$, with particular preference between 75 $g/m^2$ and 125 $g/m^2$. As the degree of compression goes up and the paper fiber length goes down, there is typically an increase in the transparency of the papers. For reduced UV permeability, therefore, relatively thick papers with relatively low levels of compression are particularly suitable. Preferably, mineral coatings applied to one or both sides of the paper also lead to a considerable reduction in the UV permeability. Particular preference is given in accordance with the invention, furthermore, to the use of colored papers or papers whose translucency and UV permeability have been reduced by appropriate coloring with mineral and/or organic pigments or by means of impregnation.

Papers may be made very substantially UV-impermeable by means of an additional coating, in the form of a printing, for example. Coatings may be processed from solution, from dispersion, or as 100% systems. Possibilities include the single- or double-sided application of UV-absorbing, UV-scattering or UV-reflecting coatings. The coatings which can be used are those comprising UV absorbers, such as dyes, organic and/or inorganic color pigments (colored, white, black), organic and/or inorganic UV absorbers, such as $TiO_2$, benzophenone derivatives, hydroxybenzotriazole derivatives, triazine derivatives, or mixtures of said materials. Also possible for use in accordance with the invention are UV-reflecting metal coatings or metal oxide coatings, which are obtained, for example, by vapor deposition, sputtering, or transfer by hot embossing. Coatings may be applied to one or both sides of the paper support. In the case of double-sided coating, their nature and thickness may be the same or different. For reasons associated with the production process, symmetrical product structures are preferred in many cases, in order, inter alia, to ensure uniform absorption and release of moisture by the papers during processing and in the applied state. Release papers are provided on the adhesive composition side with an abhesive topcoat. Preference is given to the use of papers coated with silicone release coatings. Papers which may be used in accordance with the invention optionally bear printed text, symbols, etc.

Very substantially UV-impermeable polymer film liners may be rendered very substantially UV-impermeable by adding UV-absorbing, UV-scattering or UV-reflecting additives to the film matrix and/or, in the case of multilayer films, to one or more of the individual layers of which they are constructed. Another possibility for rendering them very substantially UV-impermeable is to coat the films with UV-absorbing, UV-scattering or UV-reflecting coatings. In accordance with the invention it is possible, inter alia, to use single-layer or multilayer films based on polyolefins, polyesters, polyamides, polyesteramides, polycarbonates, polyacrylates, and PVC, to name but a few. Preference is given to the use of films which by virtue of their chemical constitution already possess significant UV absorption, such as those, for example, based on aromatic polyesters. Appropriate films may be unoriented, uniaxially oriented, or biaxially oriented. Particular preference is given to biaxially oriented films based on aromatic polyesters. UV-absorbing additives which may be added to the film itself and/or to a single- or double-sided coating include UV absorbers, such as, for example, benzophenone derivatives, hydroxybenzotriazole derivatives, and triazine derivatives. Also suitable is the addition of dyes or color pigments. If the specific requirement is for colorless transparent film liners, then preference is given to the addition of transparent, UV-absorbing organic or inorganic materials of colloidal magnitude, such as transparent $TiO_2$, for example, or the addition of the above-listed UV absorbers. The aforementioned possibilities may be utilized alone or in combination.

Coatings may be applied to one or both sides of the film support. In the case of double-sided coating, their nature and thickness may be the same or different. Films are provided on the adhesive composition side with an abhesive topcoat. Preference is given to the use of films coated with silicone release coatings. Films which may be used in accordance with the invention optionally bear printed text, symbols, etc.

Outer Packaging

Substantially UV-impermeable outer packaging, realized, for example, by sealed enclosure of the adhesive strips using sealing films or sealing papers, or by packaging the adhesive sheets using thin metal foils (e.g., aluminum foils), afford the advantage, in comparison with the sole use of release films and release papers which reduce the UV transmission, of a complete UV protection, since in this case even the edge regions of the adhesive strips are fully protected. In accordance with the invention it is preferred to use sealing papers and also sealing films. The very substantial UV-impermeability of said materials may be obtained in the same way as described above for liners of low UV transmission.

UV-Impermeable Transparent Packaging Films

Very substantially UV-impermeable transparent packaging films for use in final packs (e.g., in individual packs) are preferred especially when on the one hand it should be possible to view the packaged product while on the other hand effective UV protection is required for the packaged product. Suitable materials include films for, for example, windows in cardboard cartons, blister films or tubular-bag films, which are constructed or have been treated in analogy to the above-described UV-impermeable transparent liner films.

Combinations of Aforementioned Possibilities

The aforementioned possibilities for UV protection of the self-adhesive tapes in question may be used alone or in combination.

Test Methods

UV Exposure (Atlas Suntester)

The UV source used is an "Atlas Suntest CPS+" fitted with a xenon tube. For all the tests, an exposure level of 500 $W/m^2$ is set. The distance between adhesive strip and radiation source is 15 cm. Storage times in the Suntester are between 1 and 8 days. The temperature during exposure is a constant 20±2° C. Specimens are to be assessed within 24 h following UV exposure.

Indoor Lighting Storage (Fluorescent Tube)

To simulate a typical UV exposure occurring in living, office and working areas, the pressure-sensitive adhesive strips to be tested are subjected to exposure with fluorescent tubes (Philips Warmton 830; 58 Watts). In the course of the exposure, pressure-sensitive adhesive strips are stored at a distance of approximately 2 m from 3 fluorescent tubes of the abovementioned type, arranged in parallel. The daily exposure period is approximately 11 h. The ambient temperature was measured as 25±3° C.

Peel Strength

To determine the peel strength, the pressure-sensitive adhesive strip specimen, for investigation are laminated over the full area of one side with a 23 μm thick PETP film (Hostaphan RN 25; Mitsubishi Chemicals), without air bubbles, after which the second side of the adhesive film strip is lined at one end with an approximately 6 mm long film strip (likewise of Hostaphan RN 25), so that at this end a nonadhesive grip tab region is formed on both sides. Thereafter, the adhesive film strip to be tested is bonded by its front end, using gentle finger pressure, to the test substrate (coated woodchip wallpaper: wallpaper=Erfurt Körnung 52, color=Herbol Zenit LG, wallpaper bonded to chipboard). The specimens are subsequently pressed at a pressure of 90 N per 10 $cm^2$ of bond area for 10 s, then conditioned at 40° C. for 15 minutes. The test boards are subsequently fixed horizontally so that the grippable region of the adhesive strips is directed downward. Using a clamp (mass: 20 g, corresponding to peel force of 0.2 N), a weight (mass: 50 g, corresponding to additional peel force of 0.5 N) is fastened to the nonadhesive region, so that the resultant peel load of 0.7 N acts orthogonally to the bond area. After 15 minutes and after 24 hours, the distance which the adhesive strip has peeled from the bond substrate from the beginning of the test is marked. The distance between the two markings is reported as the peel path (unit: mm per 24 h).

Tack (Finger Tack)

The finger tack is determined perceptively. The loss of finger tack relative to the starting material is measured qualitatively.

Tack (Die Tack)

To determine the die tack, the adhesive strip samples to be tested are cut to a size of approximately 20 mm×20 mm and are fastened to the same-sized specimen plate of the measuring instrument. From each of the specimens, twelve measurements are taken at different points on the 20 mm×20 mm adhesive strip surface. To this end, a highly polished steel hemisphere of diameter d=5 mm is lowered vertically on to the specimen surface at a speed of 1130 mm/min and after a contact time of 6 ms and a press force of 0.32 N is removed again vertically from the surface of the pressure-sensitive adhesive composition, again at 1130 mm/min. The maximum force occurring during the process of removal is recorded. The correlation which exists between finger tack and die tack is approximately as follows:

| F max [mN] | Finger tack |
|---|---|
| 500 | very low (−−) |
| 1000–3000 | low (−) |
| 3000–6000 | medium (0) |
| 6000–8000 | high (+) |
| >8000 | very high (++) |

Tip Shear Strength (Tip Shear Durabilities)

To determine the tip shear strength, the adhesive sheet to be tested, which measures 20 mm×50 mm and is provided at one end on both sides with a nonadhesive grip-tab region 13 mm long (obtained by laminating on 25 μm thick, biaxially oriented polyester film measuring 20 mm×13 mm (Hostaphan RN 25), is bonded by its adhesive region to the center of a highly polished square steel plate measuring 40 mm×40 mm×3 mm (length×width×thickness). On its back, the steel plate is provided centrally with a 10 cm long steel rod which sits vertically on the surface of the plate. The resulting test specimens are bonded to the test substrate with a force of 100 N (press time=5 sec) and are left in the unloaded state for 5 minutes. After the chosen tip shear load has been set by suspending a weight (20 N with 50 mm lever arm, unless otherwise specified), the time to failure of the bond (i.e., tip shear durability) is measured.

Ultimate Tensile Strength//Maximum Elongation

Measurements are made, unless noted otherwise, in accordance with DIN 53504 using standard test specimens of size S2 at a separation rate of 300 mm/min.

Measurement of the Electromagnetic Transmission

The electromagnetic transmission of the papers and films for investigation was measured on a UV spectrometer with Ulbricht sphere (UVIKON 860; Kontron). The measurements that are used makes it possible to detect the entire electromagnetic transmission, including the radiation scattered at the medium to be measured. The electromagnetic transmission was that within the wavelength range from 280 nm to 420 nm and, in part, in the wavelength range from 240 nm to 420 nm.

EXAMPLES

Example I

Different commercial adhesive tapes redetachable without residue or destruction by extensive stretching in the bond plane—tesa® Power-Strips®, tesa® Poster-Strips, 3M Command® Adhesive strips, and Plastofix® Formula Force 1000 adhesive strips from Plasto S. A.—are subjected to comparative UV exposure. For this purpose, the adhesive strips, lined with release paper or release film and, in the case of the tesa® Power-Strips®, additionally sealed in a paper pocket, are removed from their original packaging and exposed to cold-light UV radiation. Selected product properties relevant for the bonding performance are measured comparatively before and after UV exposure. The resulting properties are as follows:

| Test number | Specimen | UV exposure | Peel strength mm/24 h | Tack[1] | Tip shear durability in days | Stress at max. elongation in MPa | Max. elongation in % |
|---|---|---|---|---|---|---|---|
| I-01 | tesa ® Poster Strips | None | about 1 | ++ | n.m. | 10.0 ± 1.5 | 1250 ± 200 |
| I-02 | tesa ® Poster Strips | 1 d Suntester | 15 | o | n.m. | 9.1 | 1300 |
| I-03 | tesa ® Poster Strips | 4 d Suntester | >50 | – | n.m. | n.m. | n.m. |
| I-101 | tesa ® Poster Strips | 6 weeks indoor light storage | 5 | + | n.m. | 10.0 ± 1.5 | 1250 ± 200 |
| I-04 | tesa ® Power-Strips ® | None | n.m. | ++ | 25 | 11.0 ± 2 | 1100 ± 200 |
| I-05 | tesa ® Power-Strips ® | 1 d Suntester | n.m. | o | 10 | 10.7 | 1050 |
| I-06 | tesa ® Power-Strips ® | 4 d Suntester | n.m. | – | 2 | 9.0 | 1050 |
| I-102 | tesa ® Power-Strips ® | 6 weeks indoor light storage | n.m. | + | 12 | 11.0 ± 2 | 1100 ± 200 |
| I-07 | Command ® Adhesive[2] | None | 0 | ++ | n.m. | n.m. | n.m. |
| I-08 | Command ® Adhesive[2] | 1 d Suntester | 1 | + | n.m. | n.m. | n.m. |
| I-09 | Command ® Adhesive[2] | 4 d Suntester | >50 | – | n.m. | n.m. | n.m. |
| I-07a | Command ® Adhesive[3] | None | 0 | ++ | >50** | 2.8 | 585 ± 25 |
| I-08a | Command ® Adhesive[3] | 1 d Suntester | 1 | + | n.m. | 2.8 | 585 ± 25 |
| I-09a | Command ® Adhesive[3] | 4 d Suntester | >50 | – | 0.1** | 2.8 | 580 ± 25 |
| I-103 | Command ® Adhesive[3] | 6 weeks indoor light storage | 3 | + | n.m. | 2.8 | 580 ± 25 |
| I-10 | Formula Force 1000[4] | None | 1 | + | n.m. | 2.8 | 695 ± 25* |
| I-11 | Formula Force 1000[4] | 1 d Suntester | 2 | n.m. | n.m. | 2.8 | 700 ± 25* |
| 1-12 | Formula Force 1000[4] | 4 d Suntester | >50 | –– | n.m. | 2.6 | 690 ± 25* |

n.m. = value was not measured
[1]++: very high; +: high; o: medium; –: low; ––: very low
[2]Command ® Adhesive Poster Strips; article number 17025
[3]Command ® Adhesive Large Hook Replacement Strips; article number 17022
[4]Article number 716165
*Measured on original adhesive strips. These strips are fixed between plane-parallel clamping jaws such that the adhesive strip length clamped between the jaws is 14 mm
**Adhesive strip width: 19 mm For the UV transmissions of the release papers used in the individual products, or in the case of the tesa® Power-Strips® the release paper/sealing paper combination used, the following values were measured:

| Specimen designation | % Transmission Wavelength range: 240–280 nm | % Transmission Wavelength range: 280–320 nm | % Transmission Wavelength range: 320–360 nm | % Transmission Wavelength range: 360–420 nm |
|---|---|---|---|---|
| tesa ® Poster-Strips | n.m. | 4.2 | 10.8 | 25.2 |
| tesa ® Power-Strips ® | n.m. | 4.2 | 10.8 | 25.2 |
| tesa ® Power-Strips ® including paper sealing envelope (unprinted side) | n.m. | 3.7 | 9.6 | 13.5 |
| Command ® Adhesive - "wall side" | 2.0 | 5.7 | 11.4 | 18.4 |
| Command ® Adhesive - "object side" | 2.2 | 6.7 | 14.0 | 21.3 |
| Formula Force 1000 - lower (thick) liner film | 1.6 | 1.9 | 72.7 | 89.5 |

-continued

| Specimen designation | % Transmission Wavelength range: 240–280 nm | % Transmission Wavelength range: 280–320 nm | % Transmission Wavelength range: 320–360 nm | % Transmission Wavelength range: 360–420 nm |
|---|---|---|---|---|
| Formula Force 1000 - upper (thin) liner film | 1.4 | 11.1 | 84.0 | 90.4 |

In each of the cases examined, following UV exposure there is a measurable reduction in selected properties important for product performance, despite the fact that the release papers or release paper/sealing paper combination used shield the product from a considerable fraction of the UV radiation that damages the surface of the adhesive composition. No substantial differences are observed here between the different liner papers and liner films used for the top and bottom side of the Command® Adhesive strips and, respectively, the Plastofix® adhesive strips. In all cases, there is a significant reduction in the peel strength, tack, and tip shear durabilities after just short periods of exposure. After a number of days of UV exposure, all of the adhesive strips cannot be used, or can be used only now with very severe restrictions, for the intended application. In contrast, for the systems considered here and under the test conditions chosen here, the tensile elongation characteristics of the adhesive strips are affected only slightly if at all, within the bounds of measurement accuracy.

More extensive investigations show that 1 day of UV exposure has approximately the same effect on the tip shear durabilities as 15 days of indoor light storage. The observed effects of a reduction—in some cases significant—in product performance following UV exposure in the Suntester are therefore applicable to the conditions in many typical home and office environments.

Example II

Different commercial adhesive tapes redetachable without residue or destruction by extensive stretching in the bond plane—tesa® Power-Strips®, tesa® Poster-Strips, 3M Command® Adhesive strips, and Plastofix® Formula Force 1000 adhesive strips from Plasto—are subjected to comparative UV exposure. For this purpose, the original sales packs are subjected to cold-light UV exposure in the Suntester. Exposure is conducted in each case so that the front of the packs face the light source. Selected product properties relevant for the bonding performance are measured comparatively before and after UV exposure. The resulting properties are as follows:

| Test number | Specimen | UV exposure | Peel strength in mm/24 h | Tack[1] | Tip shear durability in days | Stress at max. elongation in MPa | Max. elongation in % |
|---|---|---|---|---|---|---|---|
| II-01 | Tesa ® Poster-Strips | None | 1 | ++ | n.m. | 10.0 ± 1.5 | 1250 ± 200 |
| II-02 | Tesa ® Poster-Strips | 1 d Suntester | * | * | * | * | * |
| II-03 | Tesa ® Poster-Strips | 4 d Suntester | * | * | * | * | * |
| II-04 | tesa ® Power-Strips | None | n.m. | ++ | 25 | 11.0 ± 2 | 1100 ± 200 |
| II-05 | tesa ® Power-Strips | 1 d Suntester | * | * | * | * | * |
| II-06 | tesa ® Power-Strips | 4 d Suntester | * | * | * | * | * |
| II-07 | Command ® Adhesive** | None | 0 | ++ | >50 | 2.8 | 585 ± 25 |
| II-08 | Command ® Adhesive** | 1 d Suntester | n.m. | + | 30 | 2.8 | 585 ± 25 |
| II-09 | Command ® Adhesive** | 4 d Suntester | >50 | – | 0.1 | 2.8 | 580 ± 25 |
| II-10 | Formula Force 1000*** | None | 1 | + | n.m. | 2.8 | 695 ± 25 |
| II-11 | Formula Force 1000*** | 1 d Suntester | 2 | n.m. | n.m. | 2.8 | 700 ± 25 |
| II-12 | Formula Force 1000*** | 4 d Suntester | tackfree | –– | n.m. | 2.6 | 690 ± 25 |

n.m. = value was not measured
[1]++: very high; +: high; o: medium; –: low; ––: very low
* No changes relative to unexposed product, since packaged in opaque boxes
** Command ® Adhesive Large Hook Replacement Strips; article number 17022
*** Article number 716165

For the transmissions of the transparent packaging materials (film blisters) in the ultraviolet wavelength range, the following values were measured:

| Specimen designation | % Transmission Wavelength range: 240–280 nm | % Transmission Wavelength range: 280–320 nm | % Transmission Wavelength range: 320–360 nm | % Transmission Wavelength range: 360–420 nm |
|---|---|---|---|---|
| tesa ® Poster-Strips | * | * | * | * |
| tesa ® Power-Strips ® | * | * | * | * |
| Command ® Adhesive** | 68.5 | 86.4 | 89.1 | 90.5 |
| Command ® Adhesive*** | 2.8 | 51.5 | 79.8 | 89.2 |
| Formula Force 1000**** | 1.6 | 2.2 | 78.0 | 90.0 |

*Opaque cardboard box pack
**Flow pack of Command ® Adhesive Poster Strips; article number 17025
***Plastic blister pack of Command ® Adhesive Large Hook Replacement Strips; article number 17022
****Plastic blister pack; article number 716165

For all products with packaging which is completely or partly transparent, there is a significant deterioration after UV exposure in certain properties essential for product performance. Within the bounds of measurement accuracy, no differences are found from the results obtained in Ex. I, which were obtained for the adhesive strips removed from the original packaging. In the present cases, accordingly, the transparent packaging components bring about no measurable increase in the UV protection.

Example III tesa® Power-Strips® and tesa® Poster-Strips are lined with siliconized release papers of different paper quality, instead of their original release papers, and are subjected to UV exposure. The properties which result are as follows:

| Test number | Specimen description |
|---|---|
| III-01 | tesa ® Poster-Strips lined with siliconized release paper KS 900 52B20 yellow (supercalendered colored paper; Laufenberg) |
| III-02 | tesa ® Poster-Strips lined with siliconized release paper KS 900 52B20 white (supercalendered paper; Laufenberg) |
| III-03 | tesa ® Poster-Strips lined with siliconized release paper NSA 800 clay coated 52B20 (coated paper; chalk coating; Laufenberg) |

-continued

| | |
|---|---|
| III-04 | tesa ® Poster-Strips lined with siliconized release paper NSB 500 52B20 (coated paper; Laufenberg) |
| III-05 | tesa ® Poster-Strips lined with siliconized release paper B 900 wm 52B20 (supercalendered paper, less compressed than KS 900; Laufenberg) |

| Test number | UV exposure (Suntester) in days | Peel strength in mm/24 h | Tack[1] | Stress at max. elongation in MPa | Max. elongation in % |
|---|---|---|---|---|---|
| III-01a | none | 1 | ++ | 10.0 ± 1.5 | 1250 ± 200 |
| III-01b | 1 | 2 | ++ | n.m. | n.m. |
| III-01c | 4 | 5 | ++ | n.m. | n.m. |
| III-02a | none | 1 | ++ | 10.0 ± 1.5 | 1250 ± 200 |
| III-02b | 1 | 15 | ○ | n.m. | n.m. |
| III-02c | 4 | >50 | – | n.m. | n.m. |
| III-03a | none | 1 | ++ | 10.0 ± 1.5 | 1250 ± 200 |
| III-03b | 1 | 15 | ○ | n.m. | n.m. |
| III-03c | 4 | 27 | ○ | n.m. | n.m. |
| III-04a | none | 1 | ++ | 10.0 ± 1.5 | 1250 ± 200 |
| III-04b | 1 | 35 | – | n.m. | n.m. |
| III-04c | 4 | >50 | – | n.m. | n.m. |
| III-05a | none | 1 | ++ | 10.0 ± 1.5 | 1250 ± 200 |
| III-05b | 1 | 10 | + | n.m. | n.m. |
| III-05c | 4 | 37 | – | n.m. | n.m. |

[1]++: very high; +: high; ○: medium; –: low; ––: very low

For the transmissions of the release papers used in the individual specimens, in the ultraviolet wavelength range, the following values were measured:

| Specimen designation | % Transmission Wavelength range: 240–280 nm | % Transmission Wavelength range: 280–320 nm | % Transmission Wavelength range: 320–360 nm | % Transmission Wavelength range: 360–420 nm |
|---|---|---|---|---|
| KS 900 52B20 yellow | n.m. | 0.3 | 1.1 | 1.2 |
| KS 900 52B20 white | n.m. | 4.2 | 10.8 | 25.2 |
| Release paper NSA 800 clay coated 52B20 | n.m. | 2.2 | 6.2 | 17.2 |
| NSB 500 52B20 | n.m. | 17.8 | 29.6 | 34.8 |
| B 900 wm 52B20 | n.m. | 0.7 | 5.3 | 20.0 |

UV transmissions <about 2% in the wavelength range from 280 nm to 320 nm and of <about 5% in the wavelength range from 320 nm to 360 nm and of <about 20%, preferably, in the wavelength range from 360 nm to 420 nm, result in a marked improvement in the constancy of peel strength and tack following UV exposure. Extremely constant properties are obtained if the UV transmission within the whole measured frequency range between 280 nm and 420 nm is, with particular preference, ≦about 1%.

Example IV tesa® Power-Strips® and tesa® Poster-Strips are lined with siliconized release papers of different paper quality and with different printing, instead of their original release papers, and then subjected to UV exposure. Similarly, single-layer, 80 μm thick pressure-sensitive adhesive strips of formulation I, consisting of 30 parts Kraton G RP 6919 (Shell Chemicals), 20 parts Septon 2063 (Kuraray), 50 parts Regalite R 101 (Hercules), 1 part Kronos 2160 (Kronos-Titan), 0.5 part Tinuvin P (Ciba) and 0.3 part Irganox 1010 (Ciba), are investigated. The properties which result are as follows:

| Test number | Specimen description |
|---|---|
| IV-01 | tesa ® Poster-Strips lined with siliconized release paper KS 900 52B20 white (Laufenberg) |
| IV-02 | tesa ® Poster-Strips lined with siliconized release paper B 900 wm 52B20 (Laufenberg); release paper printed in white in a thickness of 3 μm on one side beneath the silicone coat |
| IV-03 | tesa ® Poster-Strips lined with siliconized release paper B 900 wm 52B20 (Laufenberg); release paper printed in white in a thickness of 3 μm each on both sides beneath the silicone coat |
| IV-04 | tesa ® Poster-Strips lined with siliconized release paper B 900 wm 52B20 (Laufenberg); release paper printed in white in a thickness of 6 μm on one side beneath the silicone coat |
| IV-05 | tesa ® Poster-Strips lined with siliconized release paper B 900 wm 52B20 (Laufenberg); release paper printed in black in a thickness of 3 μm on one side beneath the silicone coat |
| IV-06 | tesa ® Power-Strips ® lined with siliconized release paper B 900 wm 52B20 (Laufenberg); release paper printed in white in a thickness of 3 μm on one side beneath the silicone coat |
| IV-07 | tesa ® Power-Strips ® lined with siliconized release paper B 900 wm 52B20 (Laufenberg); release paper printed in black in a thickness of 3 μm on one side beneath the silicone coat |
| IV-08 | Pressure-sensitive adhesive strips of formulation I lined with siliconized release paper KS 900 52B20 white (Laufenberg) |
| IV-09 | Pressure-sensitive adhesive strips of formulation I lined with siliconized release paper B 900 wm 52B20 (Laufenberg); release paper printed in black in a thickness of 3 μm on one side beneath the silicone coat |

-continued

| Test number | UV exposure (Suntester) in days | Peel strength in mm/24 h | Tack[1] | Tip shear durability in days |
|---|---|---|---|---|
| IV-01a | 0 | 1 | ++ | n.m. |
| IV-01b | 1 | 15 | ○ | n.m. |
| IV-01c | 4 | >50 | – | n.m. |
| IV-01d | 8 | >50 | tackfree | n.m. |
| IV-02a | 0 | 1 | ++ | n.m. |
| IV-02b | 1 | 2.5 | ++ | n.m. |
| IV-02c | 4 | 4 | ++ | n.m. |
| IV-02d | 8 | 3 | ++ | n.m. |
| IV-03a | 0 | 1 | ++ | n.m. |
| IV-03b | 1 | 1.5 | ++ | n.m. |
| IV-03c | 4 | n.m. | n.m. | n.m. |
| IV-03d | 8 | 2.5 | ++ | n.m. |
| IV-04a | 0 | 1.5 | ++ | n.m. |
| IV-04b | 1 | 1 | ++ | n.m. |
| IV-04c | 4 | n.m. | n.m. | n.m. |
| IV-04d | 8 | 2 | ++ | n.m. |
| IV-05a | 0 | 0.5 | ++ | n.m. |
| IV-05b | 1 | 0.5 | ++ | n.m. |
| IV-05c | 4 | 1.5 | ++ | n.m. |
| IV-05d | 8 | 2 | ++ | n.m. |
| IV-06a | 0 | n.m. | ++ | 25 |
| IV-06b | 1 | n.m. | ++ | 25 |
| IV-06c | 4 | n.m. | ++ | 12 |
| IV-06d | 8 | n.m. | + | 5 |
| IV-07a | 0 | n.m. | ++ | 25 |
| IV-07a | 1 | n.m. | ++ | 25 |
| IV-07c | 4 | n.m. | ++ | 23 |
| IV-07d | 8 | n.m. | ++ | 20 |
| IV-08a | 0 | 8 | ○ | n.m. |
| IV-08b | 1 | 11 | ○ | n.m. |
| IV-08c | 4 | >50 | — | n.m. |
| IV-08d | 8 | >50 | — | n.m. |
| IV-09a | 0 | 8 | ○ | n.m. |
| IV-09b | 1 | 10 | ○ | n.m. |
| IV-09c | 4 | 10 | ○ | n.m. |
| IV-09d | 8 | 8 | ○ | n.m. |

n.m. = value was not measured
[1]++: very high; +: high; ○: medium; –: low; ––: very low For the transmissions of the abovementioned release papers in the ultraviolet wavelength range, the following values were measured:

| Specimen designation | % Transmission Wavelength range: 240–280 nm | % Transmission Wavelength range: 280–320 nm | % Transmission Wavelength range: 320–360 nm | % Transmission Wavelength range: 360–420 nm |
|---|---|---|---|---|
| KS 900 52B20 white | n.m. | 4.2 | 10.8 | 25.2 |
| B 900 wm 52B20; printed in white in a thickness of 3 μm on one side | n.m. | 0.5 | 1.3 | 8.4 |
| B 900 wm 52B20; printed in white in a thickness of 3 μm on both sides | n.m. | 0.2 | 0.2 | 3.7 |
| B 900 wm 52B20; printed in white in a thickness of 6 μm on one side | n.m. | 0.4 | 0.7 | 4.5 |

-continued

| Specimen designation | % Transmission Wavelength range: 240–280 nm | % Transmission Wavelength range: 280–320 nm | % Transmission Wavelength range: 320–360 nm | % Transmission Wavelength range: 360–420 nm |
|---|---|---|---|---|
| B 900 wm 52B20; printed in black in a thickness of 3 μm on one side | n.m. | 0.1 | 0.1 | 0.4 |

n.m. = value was not measured

UV transmissions <about 1% in the wavelength range from 280 nm to 320 nm and of <about 2% in the wavelength range from 320 nm to 360 nm and of <about 10%, preferably, in the wavelength range from 360 nm to 420 nm, result in excellent retention of the performance features—peel strength and tack—considered here, which are essential to the performance of the product. Extremely constant properties are obtained if the UV transmission within the whole measured frequency range between 280 nm and 420 nm is, with particular preference ≦1%.

Example V tesa® Power-Strips® and tesa® Poster-Strips are lined, instead of with their original release papers, with release films which possess different UV transmission-reducing coatings and with release films containing integrated UV transmission-reducing additives. The same release films are used to line 800 μm thick adhesive strips of formulation I (see Example IV), and these are then subjected to UV exposure. The product properties which result are as follows:

| Test number | Specimen description |
|---|---|
| V-01 | tesa ® Poster-Strips lined with siliconized 25 μm thick BOPP film |
| V-02 | Adhesive strips of formulation I lined with siliconized 25 μm thick BOPP film |
| V-03 | Adhesive strips of formulation I lined with 23 μm thick PETP film (Hostaphan RN 25 (Mitsubishi) siliconized on one side; silicone: 52B20 (Laufenberg)). |
| V-04 | Adhesive strips of formulation I lined with siliconized 23 μm thick PETP film (Hostaphan RN 25 (Mitsubishi); silicone: 52B20 (Laufenberg)). Release film printed on its reverse face with a clearcoat containing colloidal titanium dioxide (Hombitec RM 300 WP (Sachtleben)) and Tinuvin 1130 (Ciba). |
| V-05 | Adhesive strips of formulation I lined with siliconized 23 μm thick PETP film (Hostaphan RN 25 (Mitsubishi); silicone: 52B20 (Laufenberg)). Release film printed on its reverse face with a clearcoat containing highly transparent Tinuvin 1130 (Ciba) colored yellow. |
| V-06 | Adhesive strips of formulation I lined with siliconized Hostaphan D074E GUV (50 μm PETP with integrated UV transmission reducing additives (Mitsubishi); silicone: 52B20 (Laufenberg)) |

| Test number | UV exposure (Suntester) | Peel strength in mm/24 h | Tack[1] |
|---|---|---|---|
| V-01a | 0 | 1 | ++ |
| V-01b | 1 | >50 | – |
| V-01c | 4 | >50 | – |
| V-01d | 8 | >50 | – |
| V-02a | 0 | 8 | ○ |
| V-02b | 1 | >50 | – |
| V-02c | 4 | >50 | – |
| V-02d | 8 | >50 | – |
| V-03a | 0 | 8 | ○ |
| V-03b | 1 | 40 | – |
| V-03c | 4 | >50 | – |
| V-03d | 8 | >50 | – |
| V-04a | 0 | 8 | ○ |
| V-04b | 1 | 10 | ○ |
| V-04c | 4 | >50 | – |
| V-04d | 8 | >50 | – |
| V-05a | 0 | 8 | ○ |
| V-05b | 1 | 10 | ○ |
| V-05c | 4 | 10 | ○ |
| V-05d | 8 | 11 | ○ |
| V-06a | 0 | 8 | ○ |
| V-06b | 1 | 9 | ○ |
| V-06c | 4 | 13 | ○ |
| V-06d | 8 | 18 | ○ |

[1]++: very high; +: high; ○: medium; –: low; ––: very low

For the transmissions of the abovementioned release papers in the ultraviolet wavelength range, the following values were measured:

| Specimen designation | % Transmission Wavelength range: 240–280 nm | % Transmission Wavelength range: 280–320 nm | % Transmission Wavelength range: 320–360 nm | % Transmission Wavelength range: 360–420 nm |
|---|---|---|---|---|
| V-01, V-02 | 72.6 | 79.4 | 85.7 | 89.1 |
| V-03 | 2.2 | 8.6 | 81.3 | 85.8 |
| V-04 | 0.8 | 1.6 | 13.7 | 61.0 |
| V-05 | 0.2 | 0.2 | 0.3 | 0.6 |
| V-06 | 0.5 | 0.3 | 0.3 | 50.4 |

Adhesive strips lined with siliconized BOPP films not provided with UV protection exhibit a drastic reduction of peel strength and tack even after very short UV exposure (Tests V-01, V-02). Replacing the BOPP by PETP brings about merely a slight improvement in the region of short exposure times (Test V-03). Only UV permeabilities of <about 2% in the wavelength range from 240 nm to 280 nm and of <about 2% in the wavelength range between 280 nm and 320 nm, and of <about 20% in the wavelength range from 320 nm to 360 nm and of <about 80% in the wavelength range from 360 nm to 420 nm, permit a markedly reduced deterioration in the abovementioned adhesion properties (Ex. V-04). Highly constant properties are obtained if the UV transmission in the whole frequency range between 280 nm and 360 nm is ≦1% (Ex. V-05 and V-06). A further improvement is obtained if, in addition, the UV transmission in the wavelength range between 360 nm and 420 nm has very low values (Ex. V-06).

Example VI

800 μm thick adhesive strips of formulation I (see Ex. IV) measuring 20 mm×50 mm (width×length) are lined over the whole area of both sides with water-clear transparent siliconized release films, likewise measuring 20 mm×50 mm, based on an aromatic polyester, which-additionally contain UV transmission reducing additives (Hostaphan D074E GUV; Mitsubishi). Similarly, adhesive strips with the above measurements are lined on both sides with release-coated Hostaphan D074E GUV such that the release films protrude beyond the adhesive strips on both sides, congruently, by about 10 mm both in their length and in their width. In the region of the projection, the top and bottom release films are then wrapped around with 12 mm wide tesa Multi-Film such that the release films are in uninterrupted contact with one another. The tensile stress-elongation behavior of the adhesive strips after UV exposure is investigated comparatively. In the test, the adhesive strips are exposed directly to UV radiation in the edge region as a result of the scattered light that is present. The properties which result are as follows:

| Test number | Specimen description | UV exposure (Suntester) in days | Stress at max. elongation* in MPa | Max. elongation* in % |
|---|---|---|---|---|
| VI-1 | Adhesive strip formulation 1, lined congruently on both sides with D074E GUV | None | 8.9 | 795 |
| VI-2 | Adhesive strip formulation 1, lined congruently on both sides with D074E GUV | 8 | 3.4 | 820 |
| VI-3 | Adhesive strip formulation 1, lined on both sides with projecting and wrapped D074E GUV | 8 | 8.7 | 800 |

*measured on adhesive strips measuring 20 mm × 50 mm

For the case of intensive UV irradiation in the edge region of the adhesive strips, packs which line even the edge of the adhesive strips against UV exposure offer preferential UV protection. Correspondingly packaged adhesive strips in the present case exhibit virtually no reduction in the tension at maximum elongation, an important prerequisite for detachment of the adhesive strips without tearing.

Example VII tesa Poster-Strips are lined with different release papers and, in cardboard cartons measuring 80 mm×106 mm×14 mm (width×height×thickness), which include a 40 mm×50 mm (width×height) window of different UV permeability, are subjected to UV exposure. The properties which result are as follows:

| Test number | Specimen description Release papers | Specimen description |
|---|---|---|
| VII-1 | tesa ® Poster-Strips lined with siliconized release paper KS 900 52B20 white (Laufenberg) | Closed cardboard carton, no window |
| VII-2 | tesa ® Poster-Strips lined with siliconized release paper B 900 wm 52B20 (Laufenberg); release paper printed in white in a thickness of 3 μm on both sides below the silicone coating | Closed cardboard carton, no window |
| VII-3 | tesa ® Poster-Strips lined with siliconized release paper KS 900 52B20 white (Laufenberg) | Cardboard carton with window of PETP film Hostaphan RN 25 (Mitsubishi) |
| VII-4 | tesa ® Poster-Strips lined with siliconized release paper B 900 wm 52B20 (Laufenberg); release paper printed in white in a thickness of 3 μm on both sides below the silicone coating | Cardboard carton with window of PETP film Hostaphan RN 25 (Mitsubishi) |
| VII-5 | tesa ® Poster-Strips lined with siliconized release paper KS 900 52B20 white (Laufenberg) | Cardboard carton with window of Hostaphan D074E GUV (50 μm PETP with integrated UV transmission reducing additives (Mitsubishi)) |
| VII-6 | tesa ® Poster-Strips lined with siliconized release paper B 900 wm 52B20 (Laufenberg); release paper printed in white in a thickness of 3 μm on both sides below the silicone coating | Cardboard carton with window of Hostaphan D074E GUV (50 μm PETP with integrated UV transmission reducing additives (Mitsubishi)) |

| Test number | UV exposure (Suntester) in days | Peel strength in mm/24 h | Tack[1] | Damage in the edge region of the adhesive strips |
|---|---|---|---|---|
| VII-1a | 0 | 1 | ++ | none |
| VII-1b | 1 | 1 | ++ | none |
| VII-1c | 4 | 1 | ++ | none |
| VII-2a | 0 | 1 | ++ | none |
| VII-2b | 1 | 1 | ++ | none |
| VII-2c | 4 | 1 | ++ | none |
| VII-3a | 0 | 1 | ++ | none |
| VII-3b | 1 | 6 | + | none |
| VII-3c | 4 | >50 | – | ultrafine cracks |
| VII-4a | 0 | 1 | ++ | none |
| VII-4b | 1 | 1 | ++ | none |
| VII-4c | 4 | 4 | ++ | none |
| VII-5a | 0 | 1 | ++ | none |
| VII-5b | 1 | 2 | ++ | none |
| VII-5c | 4 | 15 | ○ | ultrafine cracks |
| VII-6a | 0 | 1 | ++ | none |
| VII-6b | 1 | 1 | ++ | none |
| VII-6c | 4 | 4 | ++ | none |

For the transmission of the abovementioned window films in the ultraviolet wavelength range, the following values were measured:

| Specimen designation | % Transmission Wavelength range: 240–280 nm | % Transmission Wavelength range: 280–320 nm | % Transmission Wavelength range: 320–360 nm | % Transmission Wavelength range: 360–420 nm |
|---|---|---|---|---|
| VII-1, VII-2 | * | * | * | * |
| VII-3, VII-4 | 2.2 | 8.0 | 80.2 | 84.3 |
| VII-5, VII-6 | 0.3 | 0.3 | 0.3 | 50.4 |

*Closed cardboard carton pack

The use of a very substantially UV-impermeable window film improves the constancy of peel strength and tack after UV exposure markedly Test VII-3 compared to Test VII-5). In particular, however, a very substantially UV-impermeable window brings about a reduction in the damage in the edge region of the adhesive strips, which in the case of very high UV exposures is manifested in the form of ultrafine cracks in the edge regions (visible when the adhesive strips are extended). Such cracks, during the removal of the adhesive strips by extensive stretching, may lead to the strips tearing prematurely.

What is claimed is:

1. A combination comprising:

a) at least one adhesive sheet comprising a top adhesive face, a bottom adhesive face, and four sides;

b) a UV-impermeable material applied to at least both of said faces or entirely enclosing said at least one adhesive sheet;

wherein at least one of said top adhesive face and said bottom adhesive face comprises a pressure sensitive adhesive composition based on an elastomer resin;

wherein said at least one adhesive sheet can be released from a substrate to which it has been adhered by stretching said at least one adhesive sheet in the direction of the bond formed between said at least one adhesive sheet and said substrate; and wherein the UV-impermeable material has a transmission for electromagnetic radiation in the wavelength range of 240–320 nm is below 2% and comprises at least one of the following:

i) at least one UV-impermeable transparent release liner sheet applied to and covering at least said top adhesive face and said bottom adhesive face over their entire adhesive areas;

ii) a UV-impermeable individual adhesive sheet package comprising a transparent package of UV-impermeable material completely enclosing one of said adhesive sheets in UV-impermeable material; and iii) a UV-impermeable outer transparent package comprising an outer package of UV-impermeable material completely enclosing at least one of said adhesive sheets in UV-impermeable material, wherein said outer package further comprises at least one transparent packing element.

2. The combination of claim 1, wherein the liner sheet and/or the outer package and/or the individual package are partly or fully transparent.

3. The combination of claim 2, wherein the liner sheet and/or the outer package and/or the individual package are partly or fully colored.

4. The combination of claim 1 wherein the liner sheet has been formulated to be adhesive in a contact region with the pressure-sensitive adhesive composition.

5. The combination of claim 4, wherein the liner sheet in the contact region with the pressure-sensitive adhesive composition comprise a silicone release agent.

6. The combination of claim 1, wherein the outer package comprises a sealing film, a sealing paper, or a metal foil.

7. The combination of claim 1, which comprises an individual package wherein the individual pack comprises a transparent packaging film.

8. The combination of claim 1, wherein at least one adhesive sheet has pressure-sensitive adhesive composition on both sides.

9. The combination of claim 1, wherein the pressure-sensitive adhesive composition comprises natural rubber or synthetic rubber.

10. A method of packaging at least one adhesive sheet comprising a) providing at least one adhesive sheet and a pack and b) enclosing said at least one adhesive sheet in said pack, wherein said at least one adhesive sheet comprises a pressure sensitive adhesive composition based on an elastomer resin on one or both sides; and wherein said at least one adhesive sheet can be released from a substrate to which it has been adhered by stretching said at least one adhesive sheet in the direction of the bond formed between said at least one adhesive sheet and said substrate; and wherein said pack is UV-impermeable, material has a transmission for electromagnetic radiation in the wavelength range of 240–320 nm is below 2% and comprises at least one of the following:

i) transparent liner sheet covering regions of said pressure sensitive adhesive composition;

ii) an individual package enclosing said adhesive sheet, said individual package comprising transparent packaging elements; and iii) an outer transparent package enclosing a plurality of said adhesive sheets.

11. The method of claim 10, further comprising storing at least one adhesive sheet in said pack.

12. The method of claim 10, further comprising transporting at least one adhesive sheet in said pack.

13. The method of claim 10, further comprising selling at least one adhesive sheet in said pack.

14. The combination of claim 1, which is UV-impermeable such that its transmission for electromagnetic radiation in the wavelength range 280–320 nm is below 1%.

15. The combination of claim 1, which is UV-impermeable such that its transmission for electromagnetic radiation in the wavelength range 280–320 nm is below 2%.

16. The combination of claim 15, which is UV-impermeable such that its transmission for electromagnetic radiation in the wavelength range 280–320 nm is below 1%.

17. The combination of claim 1, which is UV-impermeable such that its transmission for electromagnetic radiation in the wavelength range 320–360 nm is below 2%.

18. The combination of claim 1, which is UV-impermeable such that its transmission for electromagnetic radiation in the wavelength range 360–420 nm is below 2%.

19. The combination of claim 4, wherein the liner sheet comprises a release paper or a release film.

20. The combination of claim 9, wherein the pressure-sensitive adhesive composition comprises styrene block copolymers.

* * * * *